H. HUEBER.
VARIABLE SPEED TRANSMISSION.
APPLICATION FILED MAR. 6, 1914. RENEWED FEB. 20, 1918.

1,279,547.

Patented Sept. 24, 1918.

WITNESSES:
Emil J. Hopp
Philip D. Mashney

INVENTOR
Henry Hueber
BY
Reed & Cook
ATTORNEYS

UNITED STATES PATENT OFFICE.

HENRY HUEBER, OF SEATTLE, WASHINGTON.

VARIABLE-SPEED TRANSMISSION.

1,279,547.   Specification of Letters Patent.   Patented Sept. 24, 1918.

Application filed March 6, 1914, Serial No. 823,030.   Renewed February 20, 1918.   Serial No. 218,356.

*To all whom it may concern:*

Be it known that I, HENRY HUEBER, a citizen of Germany, and resident of the city of Seattle, in the county of King and State of Washington, have invented certain new and useful Improvements in a Variable-Speed Transmission, of which the following is a full, clear, and exact description.

The object of my invention is to supply a variable speed transmission which will automatically run from high to low gear or vice versa, through the medium of expanding or contracting disk pulleys and the further object is to reduce to a minimum the loss of power in the transmission thereof.

This expansion or contraction to be automatically effected by the varying tensions of the transmission belt, said variations being directly due to natural causes independently of any mechanical action on the part of the operator.

It may be observed that the virtue of this invention resides in the automatically varying transmission, which responds to the different road conditions to which the car may be subjected.

It is evident that any sudden or gradual added strain or relaxation which may be placed upon the transmission belt by any external causes will be immediately transmitted to the contracting and expanding friction disks which comprise the pulley action.

This invention is particularly applicable to cycle cars, or light automobiles, lathes and drill presses or any other form of machinery in which an automatic variable speed is desirable.

Having thus indicated the ends sought by me my invention consists in the construction and combination of parts to be more fully described hereafter and particularly set forth in the claims. Reference is to be had to the accompanying drawings forming a part of this specification in which similar characters of reference indicate corresponding parts in all the figures.

Figure 1:
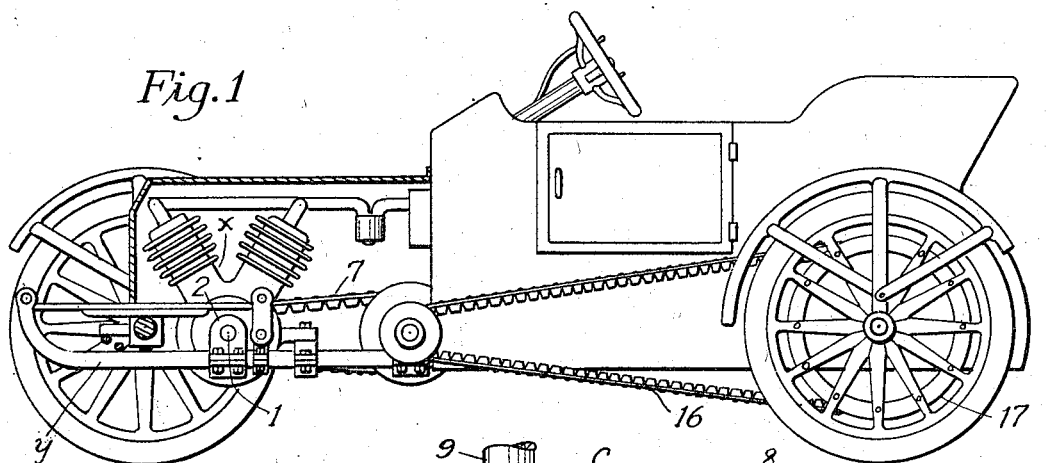
Figure 1 illustrates the side view of a cycle car to which my device is particularly applicable.
Figure 2:
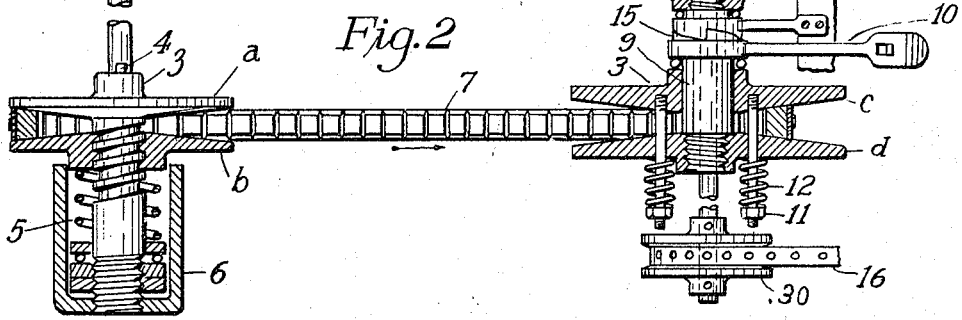
Fig. 2 is a plan view of the device in part section showing the expansible pulleys in high gear.

As illustrated in the drawings of Fig. 1, X represents a motor of any suitable design which is mounted upon the frame Y of the car. The driving shaft 1, is adapted to be mounted within bearings 2, said bearings being adjusted to the frame Y of the machine. Upon this driving shaft 1, Fig. 2 is provided an expansible pulley 3, consisting of two independent cone disks A and B. Disk A is adapted to be rigidly adjusted to the shaft 1 by a key 4, whereas, disk B is adapted to be rotatably mounted upon the shaft 1 and longitudinally actuated by the screw gear thereof.

Figure 3:
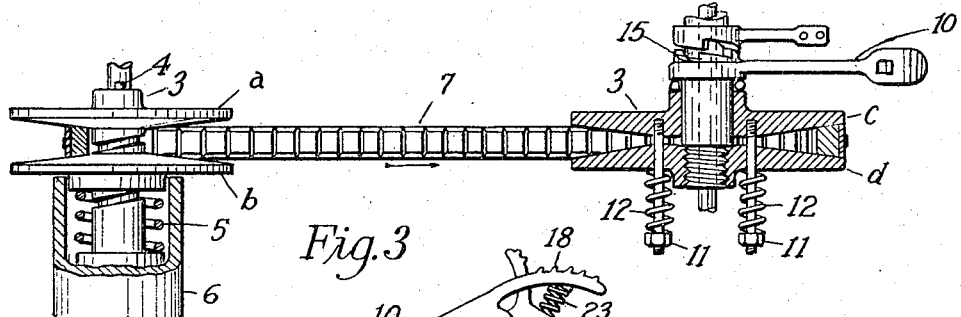
Fig. 3, is a sectional view of the pulley action showing the application thereof in low gear.
Figure 4:
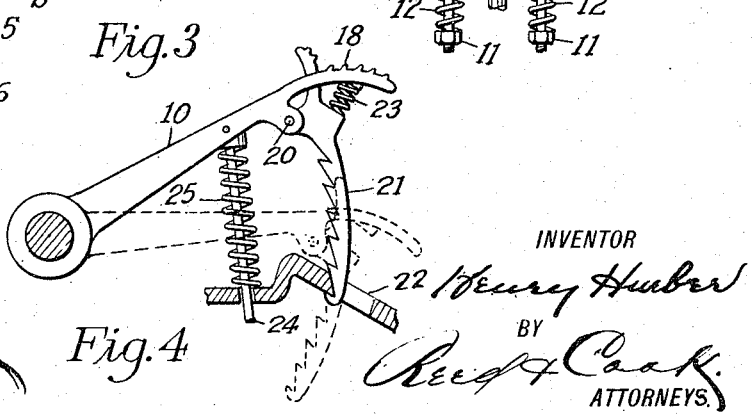
Fig. 4 is a side elevation of the pedal operating mechanism.

It is to be understood that these cone disks can be provided with sleeves to give greater purchase rigidity thereto. A coil spring 5 is interposed between the nut 6 and cone disk B to assist contraction thereof. However, in actual operation it has been found unessential. A V-shaped belt 7 Figs. 2 and 3 is adapted to engage said pulleys and transmit power to a similar pulley on the counter shaft 8. Disk C thereof is rigidly adjusted to a sleeve 9 which is slidably mounted upon said counter shaft.

Any difference in the tension of this transmission belt, due to any cause whatever, automatically adjusts the gear ratio between the two friction disk pulleys in the following manner:

In Fig. 2 the transmission belt is shown as operating at high speed and running at the peripheral edges of the driving disks A and B and near the axes of the counter shaft disks C and D. It can be observed that any added tension, or tractive power placed upon the transmission belt, will act upon the rotatably mounted disk B in the nature of a thrust. This rotatably mounted disk is thereby caused to rotate upon the screw upon which it is mounted in direct proportion to the amount of tension exercised by the transmission belt.

It has been found that when any increased tension is applied to the transmission belt 7 a creeping away of the disk B with respect to disk A is created. This is due to a proper balancing of pressures in the construction. By giving an adequate pitch to the screw 4 the increased tension of the belt or tractive power above a predetermined point, overcomes the friction of the disk B with respect to its threads and the greater thrust of pressure applied by the belt against the face of the disk B causes disk B to increase its rotation with respect to disk A and hence is moved away therefrom by the helical screw.

As soon as the tension of the belt decreases below the said predetermined point of pressure, then the greater friction of the disk B with respect to its threads causes a lagging of its rotation upon the screw and hence moves toward the disk A thereby expanding the radius of the pulley.

To neutralize what would otherwise be a slackness in the belt from the expansion of the disk B on the driving shaft, the pulley on the counter shaft 8 is provided with a movable disk C which is actuated by the springs 12 adapted to contract the disk through the medium of two bolts provided respectively with nuts 11. These bolts are rigidly adjusted to the disk C and slidably mounted through the rigid disk D. It is apparent that this spring contraction on the counter shaft pulley will automatically readjust any slackness in the belt and maintain a uniform tension in the transmission belt upon the pulley on the counter shaft.

Figure 5:
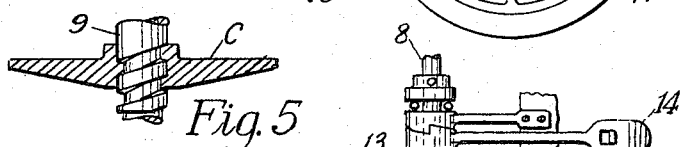
Fig. 5 is a sectional view of the rotatably mounted disk.

In Fig. 5 is shown a variation of this action in that the screw principle employed on the driving pulley is likewise applied to the counter shaft pulley. In this when the tension on the belt 7 is increased the crowding of the belt will cause a creeping of the disk B with respect to the disk A, the disk B having a rotary motion with respect to the disk A and being moved away therefrom by the helical screw, while the same increased tension will cause the disk C to creep with respect to the disk D and be moved toward the disk D on the helical screw, the movable disks B and C being on opposite sides of their respective pulleys. The same result may be obtained by placing the movable disks on the same side of their pulleys and using right and left hand screws respectively. It is preferable however, that the counter shaft pulley be provided with means by which the operator may control the gear ratio at will.

Thus in Fig. 3 is illustrated a lever operating mechanism comprised of a foot pedal 10 slidably mounted upon the sleeve 9 of the disk C. Said lever provided with a helical escapement 15 and ball bearings to be adjusted between said lever and revolving disk pulley.

It is evident that pressure on the pedal 10 will cause an expansion between the two members of the escapement action which is transmitted through the bearings to the slidable friction disk C, thus giving the operator, at will, any desired gear ratio.

Upon the counter shaft 8 is provided a clutch 13 of well known construction mounted in the usual way and actuated by lever 14.

The gear ratio of the transmission is automatically adjusted regardless of road conditions or clutch manipulations.

In Fig. 2 is shown the driving pulley 30 connected with the counter shaft and directly applying the power to rear axle through the belt 16 by the engine drive 31.

The illustration 4 shows the mechanical action of the lever mechanism which operates as follows: Pressure upon the serrated pedal 18 forces the ratchet 21 to desired point where it meshes with arm support 22. Ratchet is held in position by spring 23. A similar spring 25 is mounted around stabilizing rod 24. This action forces the lever back in position when ratchet is released from the stationary rod or arm support 22.

Having thus indicated the ends sought by me, it is to be understood that while I have employed the gear principle to expand or contract the pulley disk which constitutes the essence of the variable speed transmission, such well known equivalents as a key way or a square shaft with ball races running on flanges and controlled by a lever can be employed to expand or contract the above pulley action as they perform the same function in substantially the same way and produce the same result.

What I claim as new and desire to protect by Letters Patent is:

1. The combination with a rotatable shaft having a worm provided thereon, of an expansible pulley consisting of two independent cone disks, one of said disks adapted to be rigidly attached to the shaft, the other disk adapted to be rotatably mounted on said shaft and movable helically on said worm, a belt for moving away said helically mounted disk from said fixedly mounted disk, said helically mounted disk adapted to be moved toward said fixedly mounted disk by said worm and the decreased tension of said belt.

2. The combination with a rotatable shaft having a worm provided thereon, of an expansible pulley consisting of two independent cone disks, one of said disks adapted to be rigidly attached to the shaft, the other disk adapted to be helically movable on the worm thereof, a belt for automatically moving said helically mounted disk to contract said pulley in response to an increase in tension of said belt, said pulley being adapted to be automatically expanded by said worm in response to a decrease of tension on said belt.

3. A variable speed power transmission comprising a driving and a driven shaft, a worm provided on said driving shaft, a cone shaped disk secured to said driving shaft a similar cone-shaped disk helically movable on said worm longitudinally of said driving shaft whereby it may be moved toward or away from said first named disk, a cone shaped disk secured to said driven shaft, a similar cone shaped disk movable longitudinally on said driven shaft, elastic devices securing said last named disk to said first named disk on said driven shaft and a belt connecting said disks on said driven shaft with said disks on said driving shafts.

4. A variable speed power transmission comprising a driving and a driven shaft, a worm provided on said driving shaft, a cone shaped disk secured to said driving shaft, an opposed cone shaped disk helically movable on said worm lengthwise of said driving shaft whereby it may be moved toward or away from said first named disk, a cone shaped disk secured to said driven shaft, an opposed cone shaped disk movable lengthwise on said driven shaft, elastic devices securing said last named disk to said first named disk on said driven shaft, a belt connecting said disks on said driving shaft with said disks on said driven shaft and manually operated means for controlling the expansion and contraction of the pulleys formed by said disks.

Signed by me at Seattle, Washington, this 26th day of February, 1914.

HENRY HUEBER.

Witnesses:
  PHILIP D. MACBRIDE,
  FRANK. W. BISHOP.